Patented Nov. 21, 1944

2,363,185

UNITED STATES PATENT OFFICE 2,363,185

HEATING APPARATUS

Don F. Jones and John W. Miller, Lansing, Mich., assignors to Motor Wheel Corporation, Lansing, Mich., a corporation of Michigan Application April 17, 1941, Serial No. 388,930

4 Claims. (Cl. 126—93)

This invention relates to heating apparatus. More particularly, the invention relates to the sub-assemblies for heating apparatus consisting of the base, the heat chamber, the burner, and the outer casing.

The principal object of the invention is to provide a sub-assembly for heating apparatus comprising a one-piece pressed metal base which forms the sole support for, and the only connection between, both the heat chamber and the outer casing of said apparatus.

Another object of the invention is to provide a base for heating apparatus which is adapted to seat directly on a floor and is designed to permit the circulation through the base of the air necessary to support combustion within the heat chamber.

A still further object of the invention is to provide a base having integral heat reflecting baffles to protect the floor on which the heater is placed.

These and other objects will become more fully apparent in the following specification when read in connection with the accompanying drawings, wherein—

Figure 1:
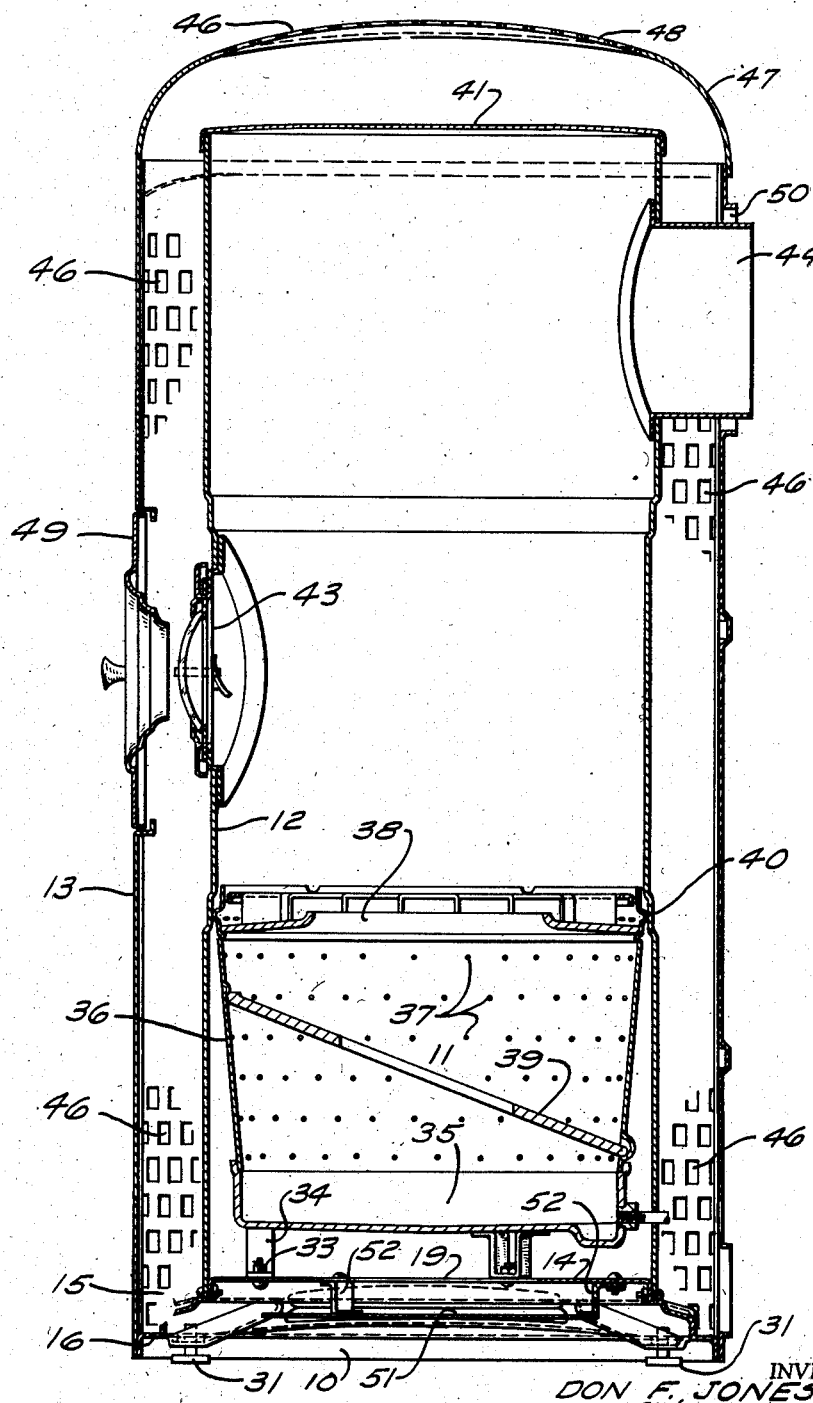
Figure 1 is a cross-sectional view of a space heater embodying the invention.

Figure 1 illustrates a heater comprising generally a base 10 which supports a burner 11 of the vaporizing pot type, a heat chamber 12, and an outer casing 13 spaced from and surrounding the heat chamber. The base 10 forms the sole support for the other three parts just mentioned. Also, it provides the only connection between the heat chamber 12 and the outer casing 13.

Figure 2:
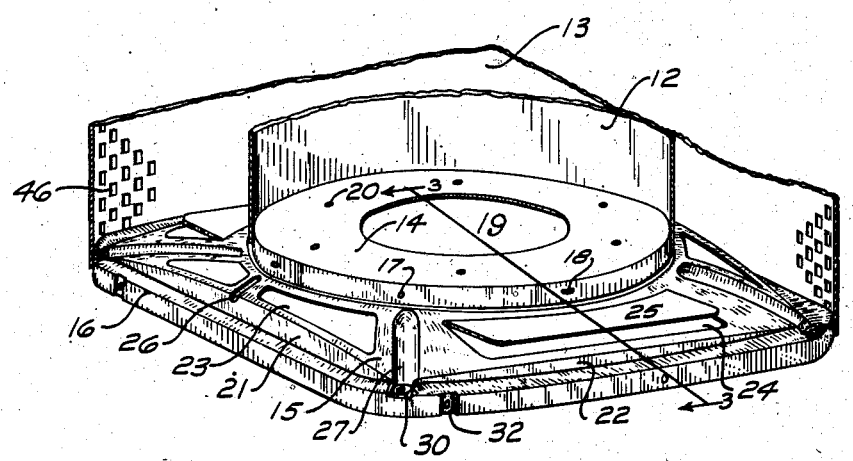
Figure 2 is a fragmentary perspective view of the base of the heater, parts of the heat chamber shell and outer casing being broken away to more clearly show the construction of the base.
Figure 3:
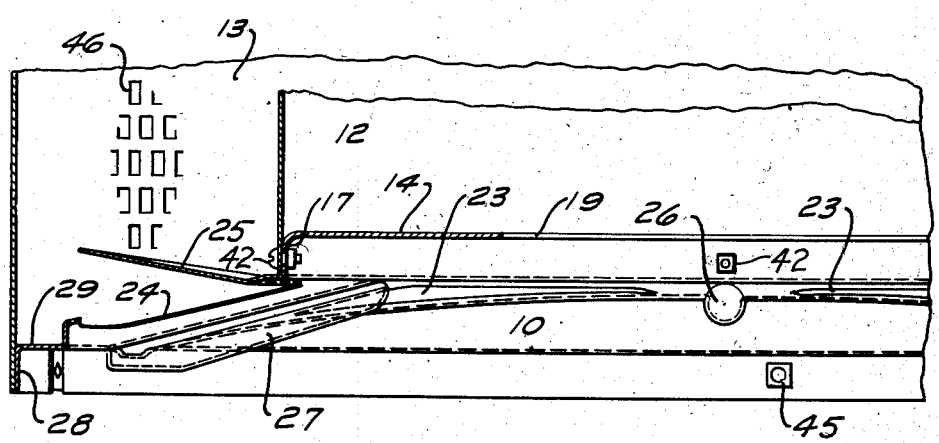
Figure 3 is a fragmentary cross-sectional view taken on substantially the line 3—3 of Figure 2.

In the embodiment of the invention disclosed, the base 10 is generally rectangular in plan, but it w'll be apparent that this shape may be modified for use with heaters of different design. The base is pressed from a single sheet of metal into the shape shown best in Figure 2. The base comprises three radially spaced portions, a central platform 14, an arched intermediate portion 15, and an angular rim portion 16.

The raised central platform 14 is circular in shape and is bounded by a vertical wall 17, preferably cylindrical. In the wall 17 are a number of bolt holes 18. The platform 14 has a large central opening 19 and a plurality of spaced bolt holes 20 surrounding the opening 19.

The arched intermediate portion 15 extends outwardly from the base of the wall 17 and at the corners of the base merges into the angular rim portion 16. Intermediate the corners the spherical portion 15 is joined to the rim by vertical walls 21 and 22. The walls 21 and 22 are necessary because the rectangular plan of the rim prevents the arched intermediate portion from merging into it except at the corners of the base.

A plurality of spaced air circulation openings 23 and 24 are formed in the portion 16. The openings 23 are located in the long sides of the base and are relatively long and narrow. They are entirely open. The openings 24 are located in the short sides of the base and are considerably wider than the openings 23. These openings are formed by completely severing the metal of the base on three sides and striking upward the tongues formed thereby to provide heat reflecting baffles 25.

Intermediate the openings 23 and 24 the arched intermediate portion 16 is provided with ribs 26 and 27 to aid in stiffening the base.

The angular rim portion 16 of the base comprises a vertical peripheral flange 28 and a narrow horizontal strip 29 which joins the arched intermediate portion 15 at the bases of the walls 21 and 22. Four threaded holes 30 are provided in the corners of the base to receive leveling screws 31. Openings 32 are formed in the flange 28 for the reception of securing means for the outer casing.

A separately formed heat reflecting baffle 51 is attached by brackets 52 to the under side of the central platform 14 beneath the opening 19.

Secured to the base 10 by bolts 33 inserted in certain of the holes 20 are three U-shaped burner supports 34. These supports are permanently secured to the burner 11. The burner may be of any suitable type. The one disclosed comprises an imperforate bottom wall 35, a side wall 36 having a plurality of air inlet openings 37 therein, and an apertured top wall 38. Within the burner is a centrally apertured inclined partition 39. Adjacent the upper edge of the burner side wall is an annular bead 40.

The heat chamber is a tubular sheet metal structure closed at its upper end by a top wall 41. The lower end of the heat chamber preferably is cylindrical and fits snugly over the cylindrical wall 17 of the platform 14, where it is secured by bolts 42. The heat chamber telescopically receives the bead 40 on the burner 11.

In the front of the heat chamber is a door 43 through which a lighted taper may be inserted to light the burner, and through which the condition of the fire may be inspected. A flue outlet 44 near the top of the heat chamber permits escape of products of combustion.

The outer casing 13 is the same shape in plan as the base 10. Its lower end telescopes over the base and is secured to the peripheral flange 28 by suitable securing means, such as bolts 45.

The casing 13 is here shown as being of the radiant circulator type. That is, the side wall is perforated as at 46 whereby heat may be radiated to the surrounding atmosphere through said openings and at the same time heated air circulates upwardly through the casing and out the openings 48 in the top wall 47. A portion of the heated air may leave through the openings 46 in the upper part of the casing.

The casing is provided with a door 49 axially aligned with the door 43 in the heat chamber and permits access thereto. At the back of the casing 11 is an opening 50 which receives the flue outlet 44. The opening 50 is considerably larger than the flue outlet.

The heater just described is intended to be placed directly on a floor, with the flange 28 in contact therewith throughout its entire extent. Under those conditions the air for supporting combustion within the heat chamber and burner is admitted through the openings 46 in the outer casing into the space between the heat chamber shell 12 and the casing 13. From there the air passes through the openings 23 and 24 into the space beneath the base and then enters the heat chamber through the opening 19. Of course, some of the air entering the openings 46 will circulate around the heat chamber where it will be heated, and will leave through the openings 48 in the top wall 47, and under certain conditions, through the upper openings 46.

In some cases the floor will not be horizontal, in which event it will be necessary to adjust one or more of the leveling screws 31 to level the heater. When that is done the flange 28 will be raised from the floor around at least part of its periphery. Air for combustion then can enter the heat chamber below the flange 28. However, in most instances leveling will be unnecessary and air will be furnished in the manner described in the previous paragraph.

The baffles 25 are provided to reflect upward heat radiated down from the burner and thereby protect the floor on which the heater is placed. Such baffles could be provided for the openings 23 but are unnecessary in the specific base shown because of the relatively narrow width of the openings. It is only in the case of relatively wide openings, such as openings 24, that such baffles are necessary.

It will be evident from the foregoing description that the base forms the sole connection between the heat chamber 12 and the outer casing 13. There is not even a connection between the heat chamber 12 and the outer casing 13 through the flue outlet 44, because the opening 50 is much larger than the flue outlet. Such construction is justified by the rigidity of the base and the solidity of the connections between these three parts.

The elimination of interior braces heretofore considered necessary greatly simplifies the construction of the heater and reduces the assembling of the heater to a few simple operations. The heat chamber 10 with the flue outlet 44 attached, and the burner 11 are first secured to the base 10, the heat chamber being telescoped over the cylindrical wall 17 and secured thereto. Then the outer casing is lowered over the inner casing until the flue outlet is aligned with the opening 50. The outer casing can then be moved laterally to align it with the base, and finally telescoped over the flange 28. There it is bolted in place by bolts 45.

Because of the unique construction of the base it is very light, yet exceedingly stiff. The arched shape of the intermediate portion 16, with the addition of the ribs 26 and 27, provides the necessary strength and rigidity to carry the load of the burner and heat chamber, and transmits the weight to the flange 28 throughout its peripheral extent.

The scope of the invention is indicated in the appended claims.

We claim:

1. Heating apparatus including, in combination, a tubular outer casing open at its lower end and having openings in its sides adjacent its lower end, a unitary tubular heat chamber removably disposed within the casing in spaced relation thereto, said heat chamber being open at its lower end, a unitary burner removably disposed in the lower end of the heat chamber, and a one piece pressed metal base detachably secured to the lower ends of the casing and heat chamber and constituting the sole connection therebetween, said base having an opening in the area between the casing and heat chamber and another opening in the area beneath the burner, and a heat reflecting baffle integral with the base overlying the first mentioned opening in the base.

2. Heating apparatus including, in combination, a tubular outer casing open at its lower end, a unitary tubular heat chamber removably disposed within the casing in spaced relation thereto, said heat chamber being open at its lower end, a unitary burner removably disposed in the lower end of the heat chamber, and a one piece pressed metal base having a portion detachably secured in telescopic engagement with the lower end of the heat chamber, and a peripheral portion detachably secured in telescopic engagement with the lower end of the casing, the portion of the base between the casing and the heat chamber being of generally arched configuration, said base constituting the sole connection between the casing and the heat chamber.

3. Heating apparatus including, in combination, a tubular outer casing open at its lower end and having openings in its sides adjacent its lower end, said casing being adapted to rest upon a floor, a unitary tubular heat chamber removably disposed within the casing in spaced relation thereto, said heat chamber being open at its lower end, a unitary burner removably disposed in the lower end of the heat chamber, and a unitary base detachably secured to the lower ends of the casing and the heat chamber constituting the sole connection therebetween, said base being wholly contained within said outer casing, the portion of the base connected to the heat chamber and the portion of the base between said outer casing and heat chamber being spaced above the lower end of the outer casing, said base having an opening in the area between the casing and heat chamber and another opening in the area beneath the burner.

4. Heating apparatus including, in combination, a tubular outer casing open at its lower end and having openings in its sides adjacent its lower end, a unitary tubular heat chamber removably disposed within the casing in spaced relation thereto, said heat chamber being open at its lower end, a unitary burner removably disposed in the lower end of the heat chamber, and a unitary base detachably secured to the lower ends of the casing and the heat chamber and constituting the sole connection therebetween, said base having an imperforate perimetral portion adapted to rest upon a floor, the portion of the base connected to the heat chamber and the portion of the base between said outer casing and heat chamber being spaced above the lower end of the outer casing, said base having an opening in the area between the casing and heat chamber and another opening in the area beneath the burner.

DON F. JONES.
JOHN W. MILLER.